US012583424B2

(12) United States Patent
Karve et al.

(10) Patent No.: US 12,583,424 B2
(45) Date of Patent: Mar. 24, 2026

(54) VEHICLE STABILITY LEARNING FOR BRAKE-TO-STEER AND MU ESTIMATION

(71) Applicants: Steering Solutions IP Holding Corporation, Auburn Hills, MI (US); Continental Automotive Systems, Inc., Auburn Hills, MI (US)

(72) Inventors: Omkar Karve, Farmington Hills, MI (US); Alexander Jennings, Bath, MI (US); Sarin Kodappully, Midland, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 35 days.

(21) Appl. No.: 18/408,887

(22) Filed: Jan. 10, 2024

(65) Prior Publication Data

US 2025/0222908 A1      Jul. 10, 2025

(51) Int. Cl.
     B60T 8/175      (2006.01)
     B60T 8/171      (2006.01)
     B60T 8/1755      (2006.01)

(52) U.S. Cl.
     CPC .......... B60T 8/17551 (2013.01); B60T 8/171 (2013.01); B60T 8/17554 (2013.01)

(58) Field of Classification Search
     CPC ........................ B60T 8/17551; B60T 8/17554
     See application file for complete search history.

(56) References Cited

U.S. PATENT DOCUMENTS

| | | | |
|---|---|---|---|
| 6,453,226 B1* | 9/2002 | Hac ........................ | B62D 7/159 |
| | | | 180/41 |
| 10,046,743 B2 | 8/2018 | Jonasson et al. | |
| 10,046,749 B2 | 8/2018 | Jonasson et al. | |
| 2002/0143451 A1* | 10/2002 | Hac ........................ | B62D 7/159 |
| | | | 701/72 |
| 2003/0042790 A1* | 3/2003 | Amberkar .............. | B62D 7/159 |
| | | | 303/140 |
| 2006/0076828 A1 | 4/2006 | Lu et al. | |
| 2010/0114431 A1* | 5/2010 | Switkes ................. | B62D 6/006 |
| | | | 701/41 |
| 2016/0001784 A1* | 1/2016 | Markkula ............. | B60W 30/02 |
| | | | 701/41 |
| 2016/0214603 A1* | 7/2016 | Owen ................... | B60W 30/02 |
| 2019/0270437 A1* | 9/2019 | Miller, Jr. ........... | G05D 1/0891 |
| 2020/0262468 A1* | 8/2020 | George ................ | B60W 50/16 |
| 2020/0262474 A1* | 8/2020 | Varunjikar .......... | B60W 40/068 |
| 2023/0055296 A1* | 2/2023 | LaBarbera ........... | B60T 8/1755 |

(Continued)

FOREIGN PATENT DOCUMENTS

DE      102022129933 A1      1/2024

OTHER PUBLICATIONS

DE Office action dated Oct. 21, 2024 for DE application No. 102024108167.8.

*Primary Examiner* — Long T Tran
(74) *Attorney, Agent, or Firm* — Ingrassia Fisher & Lorenz, LLP

(57)      ABSTRACT

A number of variations may include a method that may include modifying, in real-time, at least one brake or powertrain torque or force to one or more roadwheels of a vehicle to increase lateral stability during Brake-to-Steer functionality.

28 Claims, 3 Drawing Sheets

150

A method of preforming act using an electronic controller comprising:
    receiving vehicle dynamics data input;

152 receiving or calculating one or more stability indicators and thresholds;

154 using stability indicator duration and magnitude to determine if an instability event is occurring;

156 if an instability event is occurring, using at least one of current vehicle dynamics data input, current Mu estimate, current learned brake-to-steer modifications, or previously stored stability memory data to calculate a first brake-to-steer modification.

(56)        References Cited

U.S. PATENT DOCUMENTS

2023/0122952  A1*    4/2023   Labarbera ................. B60T 7/12
                                                        701/70
2024/0075981  A1*    3/2024   Wyciechowski  ...  B60W 40/105
2024/0359693  A1*   10/2024   Schumann  ........... B60W 10/04

* cited by examiner

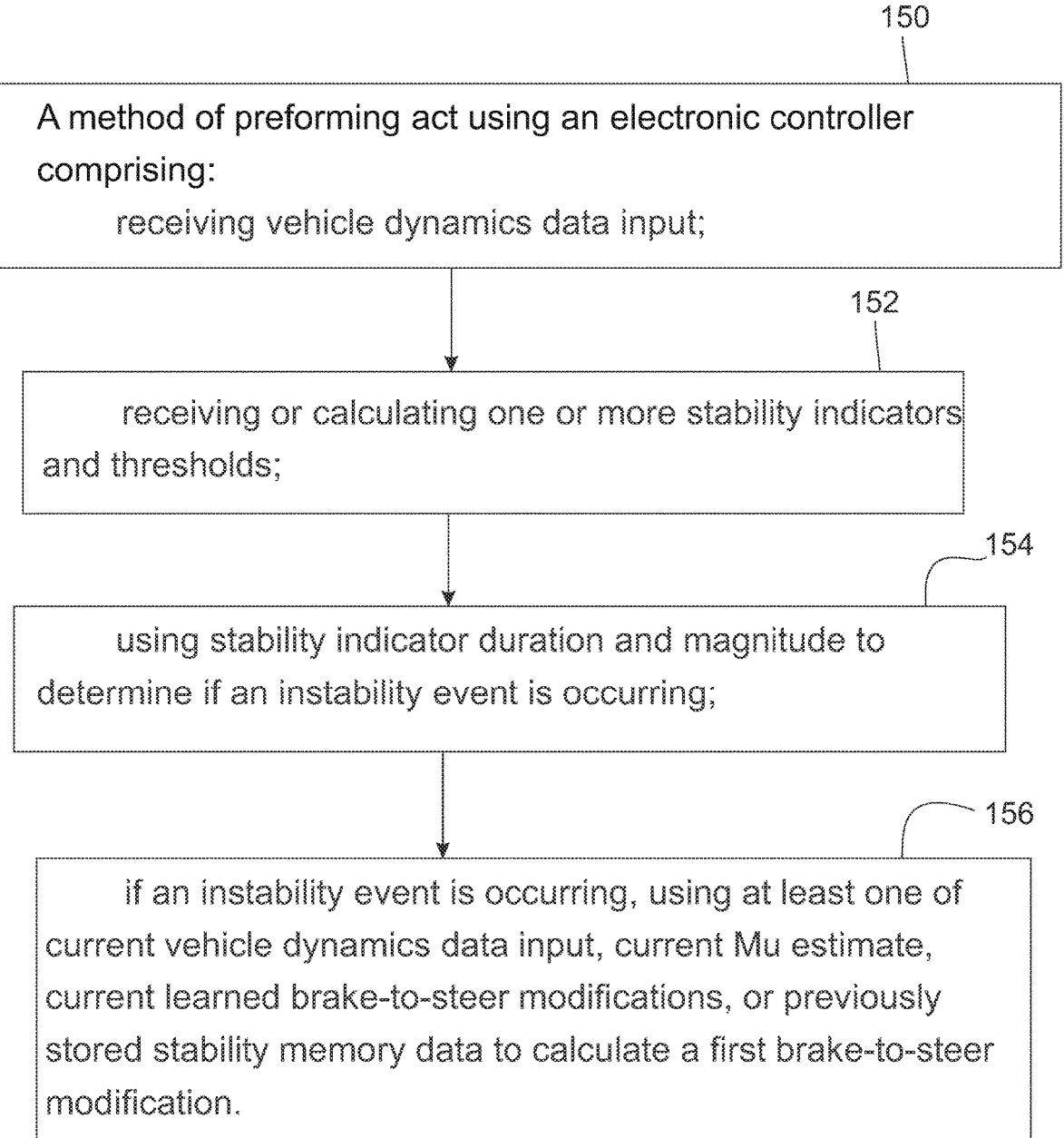

150

A method of preforming act using an electronic controller comprising:

receiving vehicle dynamics data input;

152 receiving or calculating one or more stability indicators and thresholds;

154 using stability indicator duration and magnitude to determine if an instability event is occurring;

156 if an instability event is occurring, using at least one of current vehicle dynamics data input, current Mu estimate, current learned brake-to-steer modifications, or previously stored stability memory data to calculate a first brake-to-steer modification.

*FIG. 1*

VEHICLE STABILITY LEARNING FOR BRAKE-TO-STEER AND MU ESTIMATION

TECHNICAL FIELD

The field to which the disclosure generally relates to steering, braking, and powertrain systems.

BACKGROUND

In some situations, Brake-to-Steer (BtS) braking and powertrain commands may cause vehicle instability or unintended vehicle oversteer, especially in low surface coefficient of friction (surface Mu) driving scenarios. Current vehicle instability or unintended vehicle oversteer mitigations are reactive and transitory.

Additionally, it is difficult for vehicles to accurately estimate and sense surface mu. Surface Mu information can be used to improve various vehicle functions.

SUMMARY OF ILLUSTRATIVE VARIATIONS

A number of variations may include a method that may include modifying, in real-time, at least one brake or powertrain torque or force to one or more roadwheels of a vehicle to increase lateral stability during Brake-to-Steer functionality.

A number of variations may include a method that may include increasing, reducing, or scaling at least one of electronic braking system brake commands or powertrain system commands while Brake-to-Steer is active. This may prevent vehicle instability or unintended vehicle oversteer.

Vehicle instability may lead to total loss of vehicle control or create a safety hazard. A number of variations may include a method that may reduce the potential for loss of vehicle control by modifying at least one of Brake-to-Steer brake or powertrain commands based on a number of calculated, measured, or observed stability indicators. This may not only improve vehicle safety but may also improve overall vehicle controllability with Brake-to-Steer functionality.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a method according to a number of variations;

Figure 2:
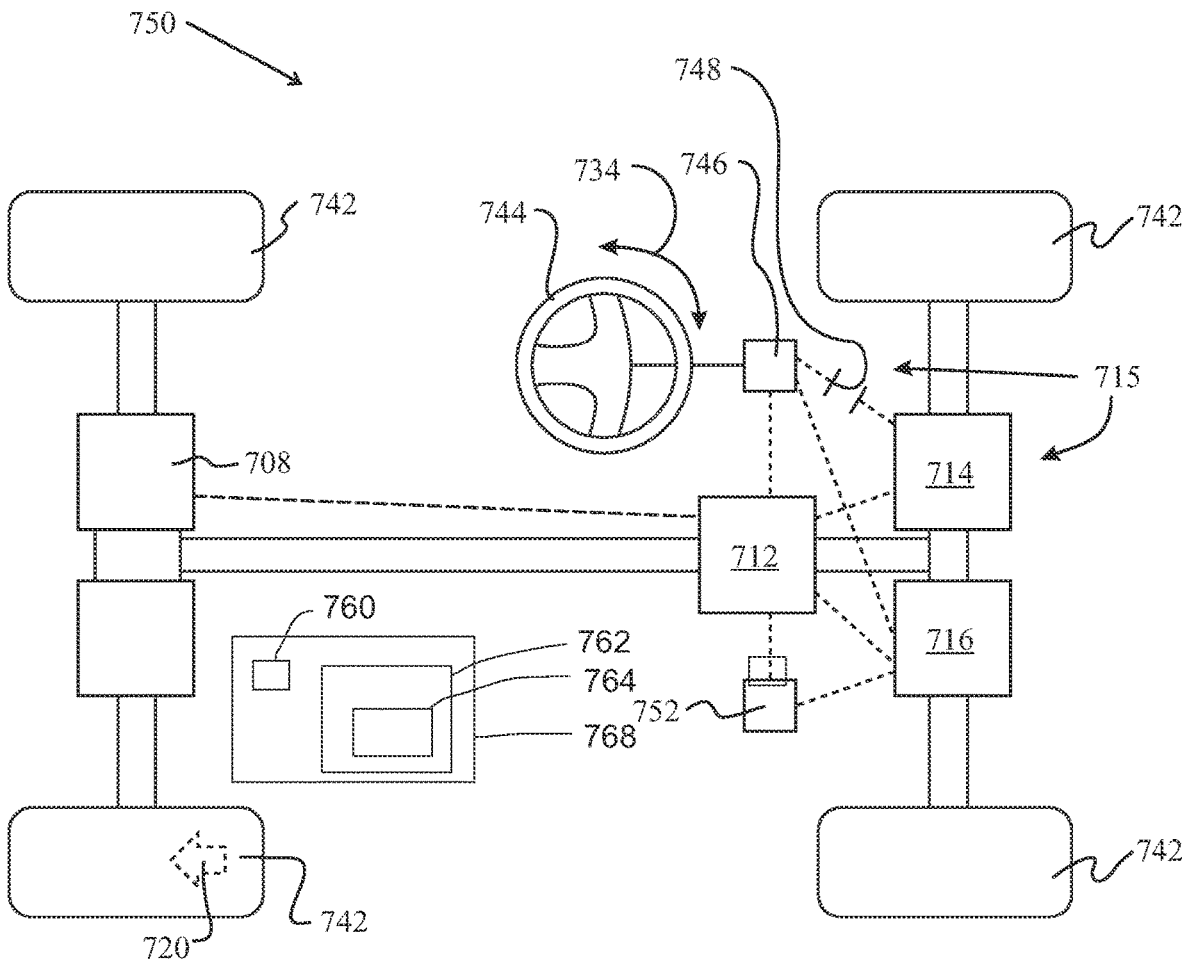
FIG. 2 depicts an illustrative variation of vehicle with a steer-by-wire system, wherein the vehicle also has the capability to perform Brake-to-Steer, and the capability to modify brake commands and powertrain commands.

The drawings are not necessarily to scale, and certain features and certain views of the drawings may be shown exaggerated in scale or in schematic in the interest of clarity and conciseness and should not be considered limiting.

DETAILED DESCRIPTION OF ILLUSTRATIVE VARIATIONS

The following description of the variations is merely illustrative in nature and is in no way intended to limit the scope of the invention, its application, or uses.

A number of variations may include a system including one of more physical components described herein and may be configured to carry out one or more acts of a method described herein. A number of variations may include a method including one of more acts or steps described herein or provide or accomplish one or more of the functionalities described herein. A number of variations may include a non-transitory computer readable medium having instructions stored thereon, executable by an electronic processor, to implement functionality described herein. A number of variations may include an electronic controller including an electronic processor, a non-transitory computer readable medium having instructions stored thereon, executable by an electronic processor, to implement functionality described herein, and which may include memory for storing data collected from vehicle sensor or generated by execution of the instruction. In a number of variations, instructions when executed by an electronic process implement the functionality of Vehicle Stability Learning for Brake-to-Steer and/or Mu Estimation which may help prevent BtS from causing instability or unintended vehicle oversteer in a proactive, reactive, and non-transitory manner, and that may adjust to the driving conditions and driving event history. Instructions implementing the Vehicle Stability Learning for Brake-to-Steer and Mu Estimation functionality may also provide surface Mu estimates using a unique learning method.

The instructions when executed by an electronic process may perform the function of receiving vehicle dynamics data input which may be from one or more vehicle sensor. Vehicle dynamics data may include, but is not limited to, vehicle speed, vehicle yaw rate, vehicle accelerations, steering wheel angle, and wheel speeds. The instructions when executed by an electronic process may perform the function of receiving or calculating one or more stability indicators and thresholds. The instructions when executed by an electronic process may perform the function of using stability indicator duration and magnitude to determine if an instability event is occurring.

If or when an instability event is occurring, the instructions when executed by an electronic process may perform the function using at least one of current vehicle dynamics data input, current Mu estimate, current learned BtS modifications, or previously stored stability memory data to calculate a new or first BtS modification which may include, but is no limited to, a modification decreasing BtS commands. Decreasing BtS commands as used herein means lowering, reducing, subtracting, multiplying by a scalar between 0 and 1, or dividing by a positive scalar greater than 1. The term "current" as used herein means at the current time an event is occurring, such as, but not limited, at the current time an instability event is occurring. The term "first" as used herein does not necessarily mean first in time. The term "second" as used herein does not necessarily mean second in time. The instructions when executed by an electronic process may also perform the function of estimating a new maximum achievable vehicle acceleration in terms of received vehicle dynamics data input, from the stored stability memory data. The instructions when executed by an electronic process may perform the function of using the new estimated maximum achievable vehicle acceleration, previous estimated maximum achievable vehicle acceleration, current estimated Mu values, and previous estimated Mu values to calculate a new or first, learned Mu estimate.

If or when an instability event is not occurring, the instructions when executed by an electronic process may perform the function of monitoring the received vehicle dynamics data input to determine if the vehicle maneuver exceeds the current estimated maximum achievable vehicle acceleration. If the vehicle acceleration exceeds the current estimated maximum achievable vehicle acceleration while an unstable event is not occurring, the instructions when executed by an electronic process may perform the function of using at least one of current vehicle dynamics data input, current Mu estimate, current learned BtS modifications, or previously stored stability memory data to calculate a new BtS modification which may include, but is not limited to, a modification increasing BtS commands. The instructions when executed by an electronic process may perform the function of estimating a new maximum achievable vehicle acceleration in terms of received vehicle dynamics data input, from the stored stability memory data. The instructions when executed by an electronic process may perform the function of using the new estimated maximum achievable vehicle acceleration, previous estimated maximum achievable vehicle acceleration, current estimated Mu values, and previous estimated Mu values to calculate a new, learned Mu estimate.

The instructions when executed by an electronic process may perform the function of using the new BtS modification to alter at least one of BtS brake or powertrain commands in a proactive, reactive, and non-transitory manner. This can occur before or after BtS function activation. The instructions when executed by an electronic process may perform the function of using the new, learned Mu estimate to enhance BtS functionality. The instructions when executed by an electronic process may perform the function of transmitting the new, learned Mu estimate to other vehicle functions.

The instructions when executed by an electronic process may perform at least one of the functions of: improving vehicle controllability and safety during maneuvers that may lead to vehicle instability; enhancing vehicle stability during BtS in a more non-transitory strategy compared to previous methods; being more adaptive than alternative BtS stability methods, as it can change its outputs based on driving event history; establishing BtS vehicle stability protections prior to BtS activation, which is proactive, and much earlier and faster than other BtS stability methods; or providing a surface mu estimate, which can be used to create smarter, more accurate, and more precise vehicle functions (including BtS) and vehicle dynamics models.

Vehicles typically include steering systems, braking systems, and powertrain systems. A steering system may be a connected steering system (a steering system with a mechanical connection between the handwheel and the rack) with power steering, or a steer-by-wire system (a steering system without a mechanical connection between the handwheel and the rack). A braking system may include various means to resist the motion of a vehicle, including frictional and electrical brakes. A powertrain may include various means for propulsion, such as an internal combustion engine or electric motor, and various means for delivering torques, forces, or pressures from the propulsion system to individual tires, including transmissions, differentials and torque vectoring differentials. A command sent to a braking or powertrain system may include commanded torque, force, throttle or pedal position, current, voltage, pressure, etc. A load may include torques, forces, or pressures. A steering, braking, or powertrain system may contain electronics, which allow them to send or receive signals and commands, and convert received commands into loads within or generated by the system, and ultimately loads at the tires. A driver of a vehicle controls the motion of a vehicle, and may include a human driver or an automated driver. A system, such as a steering system, may fail, which may include full or partial failure, or degradation.

Brake-to-Steer (BtS) is a system that may provide brake and powertrain commands to the brake and powertrain systems, based on driver intent information, in the event of a steering system failure, to assist the driver with lateral control. This may be applied in vehicles with EPS connected steering systems, or steer-by-wire systems. Brake-to-Steer may be applied in a vehicle with human or automated drivers. Driver intent may be determined from steering system signals such as handwheel angle or handwheel torque, or additionally may be determined indirectly via vehicle inputs, like vehicle lateral acceleration, yaw rate, and/or vehicle speed. BtS takes these driver intent inputs and outputs specific brake and powertrain commands to individual tires to create loads that can help the driver with lateral control of the vehicle. Some examples of BtS improvements include, but are not limited to, improved vehicle handling, reduced steering efforts when a connected EPS system has failed, or enabling lateral control of a steer-by-wire vehicle when the road wheel actuator has failed, or enabling lateral control of an automated vehicle with a connected EPS or SbW steering system, when the steering system has failed.

In some driving scenarios with BtS active, BtS may cause unintended vehicle oversteer or excessive vehicle yaw rate. An example of this scenario may occur when the driver's maneuver causes the tires to exceed the surface friction limit while cornering. To prevent unintended vehicle oversteer or excessive vehicle yaw rate caused by BtS in a proactive, reactive, and non-transitory manner, the Vehicle Stability Learning for Brake-to-Steer and Mu Estimation instructions or algorithm was developed.

The instructions when executed by an electronic process may perform the function of Vehicle Stability Learning for Brake-to-Steer and Mu Estimation and may receive vehicle dynamics data input including, but not limited to vehicle speed, vehicle yaw rate, vehicle accelerations, steering wheel angle, and wheel speeds.

The instructions when executed by an electronic process may perform the function of receiving or calculating one or more stability indicators. A calculated stability indicator may include yaw rate error. Yaw rate error can be calculated by comparing an estimated or predicted yaw rate with the measured vehicle yaw rate. Estimated yaw rate may be calculated based on lateral acceleration and vehicle speed, or steering wheel angle and vehicle speed, or individual wheel speeds. Another calculated stability indicator may include differential wheel slip. Differential wheel slip may be calculated based on individual wheel speeds and vehicle speed, or individual wheel speeds and longitudinal speeds of the wheels. Received stability indicators may include received yaw rate error, received differential wheel slip, surface mu estimates, or activation flags from external systems including but not limited to Electronic Stability Control (ESC)

activation, Antilock Brake System (ABS) activation, Traction Control System (TCS) activation, or Electronic Brake Force Distribution (EBD) activation.

The instructions when executed by an electronic process may perform the function of Vehicle Stability Learning for Brake-to-Steer and Mu Estimation may compare a calculated or received stability indicator to a learning stability indicator threshold range. The learning stability indicator threshold range may depend on at least one of vehicle dynamics data input or stability indicator magnitude (if applicable). The stability indicator threshold range may also be comprised of constants. If the stability indicators are outside their acceptable learning stability indicator threshold range for a time duration that exceeds the time duration threshold, the executed instructions may set an instability detection active flag. The time duration threshold may be a constant, may be dependent on the magnitude of the stability, or may be dependent on a vehicle dynamics data input, for example, speed. When the stability indicators are within their acceptable learning stability indicator threshold range or when the stability indicators are outside the acceptable learning stability indicator threshold range for less time duration than the time duration threshold, the executed instructions may set an instability detection inactive flag. An instability detection active flag may indicate an instability event is occurring. An instability detection inactive flag may indicate an instability event is not occurring.

If an instability detection active flag is set, the executed instruction may use at least one of current vehicle dynamics data input, current Mu estimate, current learned BtS modifications, counters, or previously stored stability memory data to calculate a new BtS modification which may include a modification decreasing BtS commands. Additionally, the instructions when executed by an electronic process may perform the function of storing stability memory data to memory while the instability detection active flag is set. Vehicle dynamics data input may include vehicle speed, vehicle yaw rate, vehicle accelerations, handwheel angle, or wheel speeds. Current Mu estimate may include the executed instruction's latest surface Mu estimate, a programmed initial value, or a saved value from a previous key cycle. Current learned BtS modifications may include the latest modifier values, the instructions when executed by an electronic process has calculated, a programmed initial value, or a saved value from a previous key cycle. Stability memory data may include vehicle dynamics data values, time stamps, time durations, counts, stability indicator magnitudes, stability indicator time durations, previous BtS command modifier values, or previous Mu estimates. A new BtS modification may be achieved through various means, including but not limited to, command scalars, offsets, lookup tables, counters, or other numeric calculations. These modifications may depend on stability indicator magnitudes, time durations, or vehicle dynamics data inputs such as vehicle speeds, vehicle yaw rates, or vehicle accelerations. The new calculated BtS modification may be applied until another new BtS modification is calculated, so this modification may be ready for application prior to BtS activation, during BtS activation, during a key cycle, or during following key cycles.

If an instability detection active flag is set, the instructions when executed by an electronic process may perform the function of estimating a new maximum achievable vehicle acceleration in terms of received vehicle dynamics signals. This maximum may be in terms of vehicle yaw rate, vehicle speed, vehicle accelerations, handwheel angle, or a combination of the previously listed vehicle dynamics signals. The new maximum may be calculated by storing vehicle signal values and timestamps as stability memory data to memory while the instability detection active flag is set. The stored values may be averaged, weighted averaged, blended, or processed in some way to calculate a new estimated maximum achievable vehicle acceleration, which may be stored to memory.

If an instability detection active flag is set, the instructions when executed by an electronic process may perform the function of using at least one of the new estimated maximum achievable vehicle acceleration or stability memory data, and vehicle dynamics calculations to estimate a new surface mu estimate. This calculation may include a vehicle model, a weighting function, data correlation, or some combination of the above. A vehicle model may include but is not limited to a dual track model, a bicycle model, or a point model.

If an instability detection inactive flag is set, the instructions when executed by an electronic process may perform the function of monitoring the received vehicle dynamics data input to determine if the current vehicle acceleration exceeds the estimated maximum achievable vehicle acceleration. If the instability detection inactive flag is set and the estimated maximum achievable vehicle acceleration magnitude is not exceeded for a time duration that exceeds a time duration threshold, the executed instruct may not change its outputs. If the instability detection inactive flag is set and the estimated maximum achievable vehicle acceleration magnitude is exceeded for a time duration that exceeds a time duration threshold, the instructions when executed by an electronic process may perform the function of using at least one of current vehicle dynamics signals, current mu estimate, current learned BtS modifications, counters, or previously stored stability memory data to calculate a new BtS modification which may include a modification increasing BtS commands. The time duration threshold may be a constant, may be dependent on the magnitude of the stability, or may be dependent on a vehicle dynamics data input, for example, speed. Additionally, the instructions when executed by an electronic process may perform the function of storing stability memory data to memory while the instability detection inactive flag is set and the estimated maximum achievable vehicle acceleration is exceeded. A new BtS modification may be achieved through various means, including but not limited to, command scalars, offsets, lookup tables, counters, or other numeric calculations. These modifications may depend on stability indicator magnitudes, time durations, or vehicle dynamics data inputs such as vehicle speeds, vehicle yaw rates, or vehicle accelerations. The new BtS modification may be applied until another new BtS modification is calculated, so this modification may be applied prior to BtS activation, during BtS activation, during a key cycle, or during following key cycles.

If an instability detection inactive flag is set and the estimated maximum achievable vehicle acceleration is exceeded, the instructions when executed by an electronic process may perform the function of estimating a new maximum achievable vehicle acceleration in terms of received vehicle dynamics signals. This new maximum may be in terms of vehicle yaw rate, vehicle accelerations, handwheel angle, or a combination of the previous vehicle dynamics signals. The new maximum may be calculated by storing vehicle signal values and timestamps as stability memory data to memory while the instability detection inactive flag is set and the estimated maximum achievable vehicle acceleration is exceeded. The stored values may be blended in some way to calculate a new estimated maximum achievable vehicle acceleration, which is then stored to memory. Blended as used herein means switching, averaging, weighting averaging, or filtering.

If an instability detection inactive flag is set and the maximum achievable vehicle acceleration value is exceeded, the instructions when executed by an electronic process may perform the function of using the new estimated maximum achievable vehicle acceleration, previously estimated Mu values, and vehicle dynamics calculations to estimate a new surface Mu estimate. This calculation may include a dynamic vehicle model, a weighting function, data correlation, or some combination of the above.

The instructions when executed by an electronic process may perform the function of using the new BtS modification to alter at least one of BtS brake or powertrain commands in a proactive, reactive, or non-transitory manner. The term "modification" as used herein may include increasing or decreasing an original unmodified value in any way, including adding or subtracting an offset, or multiplying or dividing by a ratio or scalar. The alteration may be applied until another new BtS modification is calculated, so this modification may be applied prior to BtS activation, during BtS activation, during a key cycle, or during following key cycles. The alteration is intended to keep BtS commands within a safe range such that BtS will not cause vehicle instability or excessive vehicle oversteer. The non-transitory BtS command modifications can occur simultaneously with other transitory BtS command modification methods not described herein if applicable.

The instructions when executed by an electronic process may perform the function of using new estimated surface Mu data to enhance BtS functionality by incorporating the mu estimate information into the BtS command calculation. The BtS function may also provide a flag to downstream BtS functions to indicate that BtS should switch to an alternative BtS control mode or method that is better suited for the estimated surface Mu. The instructions when executed by an electronic process may perform the function of transmitting the new estimated surface Mu data to other vehicle functions. For example, if a vehicle has a Mu fusion function that estimates surface Mu from different sources, the BtS Mu estimate can contribute to improving the quality of the Mu fusion estimate. The Mu fusion function may use switching, averaging, weighted averaging, or filtering Mu data or other data. The Mu estimate may also be used by other functions, such as dashboard warnings, steering functions, braking functions, propulsion functions, or ADAS functions to improve performance and vehicle dynamics model precision.

FIG. 1 illustrates a method of creating a new BTS modification if an instability event is occurring. The method may include using an electronic controller comprising: receiving vehicle dynamics data input 150; receiving or calculating one or more stability indicators and thresholds 152; using stability indicator duration and magnitude to determine if an instability event is occurring 154; if an instability event is occurring, using at least one of current vehicle dynamics data input, current Mu estimate, current learned brake-to-steer modifications, or previously stored stability memory data to calculate a first brake-to-steer modification 156.

Figure 3:
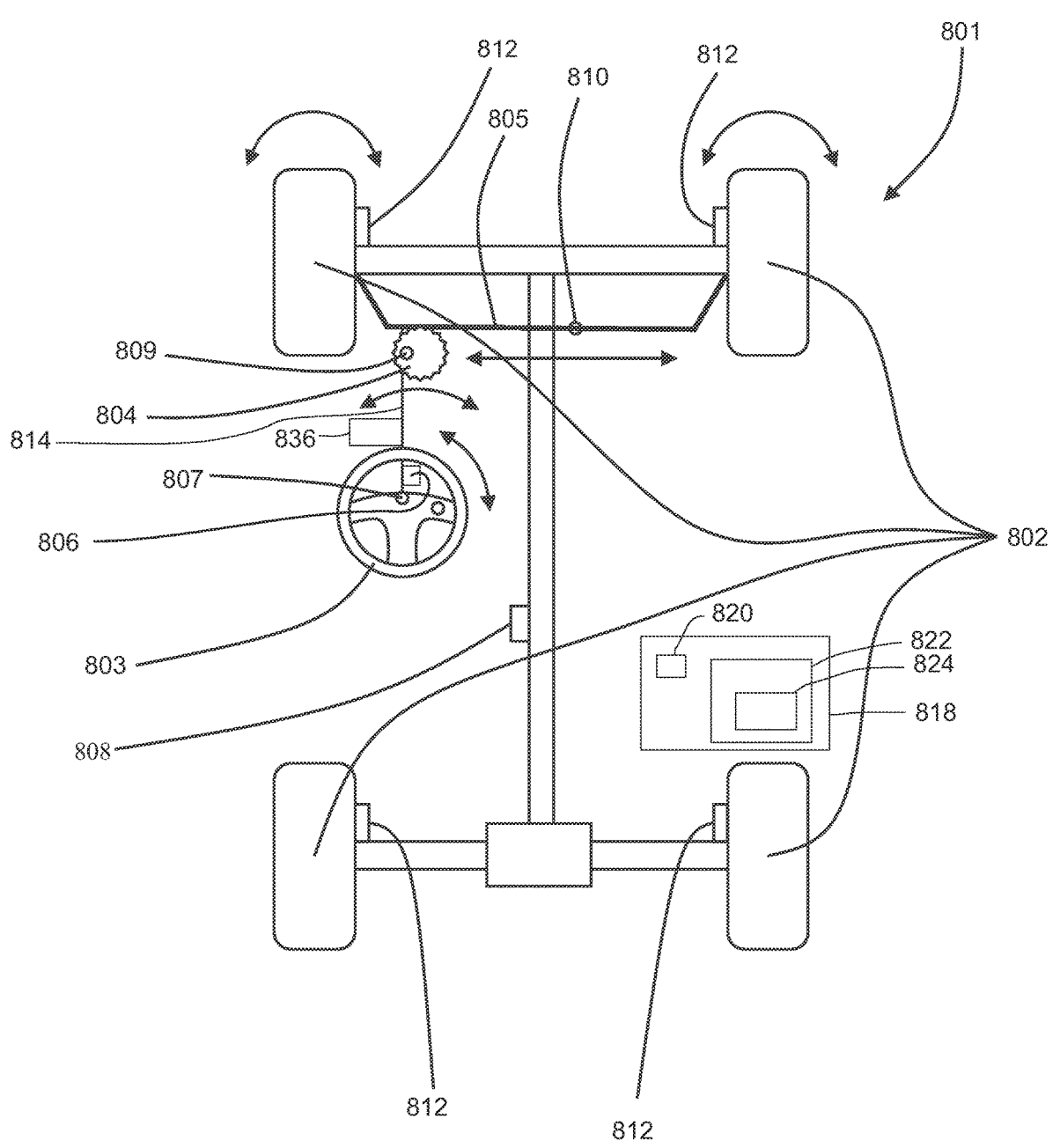
FIG. 3 depicts an illustrative variation of a vehicle with a connected power steering system, wherein the vehicle also has the capability to perform Brake-to-Steer, and the capability to modify brake commands and powertrain commands.

FIG. 2 illustrates a vehicle having steer-by-wire functionality and a system for carrying out methods described herein. FIG. 3 illustrates a vehicle with a mechanical steering linkage and a system for carrying out methods described herein. The components and systems of FIGS. 2 and 3 may be interchanged provided that the vehicle in FIG. 2 retains steer-by-wire functionality and the vehicle in FIG. 3 retains a mechanical steering linkage.

FIG. 2 depicts an illustrative variation of various portions of a vehicle equipped with hardware sufficient for carrying out at least some of the systems and methods described herein. All sensors depicted in the illustrative variation are illustrative, so the sensed inputs may come from various other vehicle locations or vehicle sensors given they provide a similar sensing function. A vehicle 750 may include an electronic controller 712 constructed and arranged to provide Brake-to-Steer functionality in the vehicle 750. The controller 712 may be in operable communication with a steer-by-wire system 715, and an electronic braking system 716. The steer-by-wire system 715 may be composed of handwheel actuator 746 and roadwheel actuator 714. The steer-by-wire system 715 may be constructed and arranged to turn at least one road wheel 742. The electronic braking system 716 may apply brake force or brake torque 720 to determined appropriate roadwheels 742. A driver may utilize a handwheel 744 including at least one handwheel actuator 746 to provide driver input 734 for lateral movement and send steering commands to the steer-by-wire system 715 and roadwheel actuator 714. The electronic braking system 716 may be in operable communication with the controller 712 and a driver braking input system 752, such as a brake pedal system, to receive driver braking input. According to some variations, the handwheel actuator 746 may be in operable communication with the controller 712, the steer-by-wire roadwheel actuator 714, or the electronic braking system 716. In some variations, the handwheel actuator 746 may be disconnected from or in a failure state 748 or unable to communicate with the steer-by-wire roadwheel actuator 714. In such a variation, the handwheel actuator 746 may communicate steering commands to the controller 712, which may receive steer-by-wire system 715 health status information. Where the controller 712 has received steer-by-wire system 715 information indicative of steer-by-wire system 715 failure 748 or roadwheel actuator 714 failure, the controller 712 may convert steering commands from the handwheel actuator 746 to brake force or brake torque commands to be communicated to the electronic braking system 716. The electronic braking system 716 may apply brake force or brake torque 720 to determined appropriate roadwheels 742 to effectuate lateral movement of the vehicle as input 734 by the driver via the handwheel 744. Controller 712 may also send powertrain commands to a powertrain system 708. Controller 712 and any other controller, for example controller 768, may be provided to carry out one or more functions described herein and may include a processor 760, memory 762, wherein the instructions 764 stored in the memory 762 are executable by the processor 760.

Referring now to FIG. 3, an illustrative variation of a vehicle equipped with hardware that allows it to carry out at least some of the methods disclosed herein is shown. All sensors depicted in the illustrative variation are illustrative, so the sensed inputs may come from various other vehicle locations or vehicle sensors given they provide a similar sensing function. A vehicle 801 may be equipped with roadwheels 802 and a handwheel 803 for turning the roadwheels 802 via a pinion 804 that engages a rack 805 that is constructed and arranged to turn the roadwheels 802. In the illustrative variation shown, the handwheel 803 may be equipped with a hand wheel torque sensor 806 and a hand wheel angle sensor 807 so that any turning of the handwheel may produce sensor data that may be communicated to or accessed by a controller 808. Controller 808 may provide all other functionality described herein including Brake-to- Steer, Brake-to-Steer Stability, Brake-to-Steer Stability Learning, steer-by-wire control, powertrain control, braking control, control a vehicle system, or one or more other controllers may be provided to do the same. Although, in this illustrative variation, the controller 808 is shown onboard the vehicle, the controller may also be located somewhere apart from the vehicle and communicate wirelessly by the sensors or the vehicle. Pinion 804 may be equipped with a pinion torque sensor 809 so that any turning of the pinion may be observed by or communicated to the controller 808 and utilized by the methods described herein. In the illustrative variation shown, rack 805 may be equipped with a rack force sensor 810 so that any rack forces detected during driving may be observed by or communicated to the controller 808 and utilized by the methods described herein. The vehicle may have a steering shaft 814 connecting the steering wheel or steering interface 803 to a pinion 804. An electric power steering assist or hydraulic power steering device 836 may be connected to the shaft 814 to assist the driver in steering the roadwheels of the vehicle by reducing the force or torque the driver would need to apply to the steering wheel or steering interface 803 if the power steering device 836 was not present. Also shown in this illustrative variation, the roadwheels 802 may be equipped with road-wheel sensors so that any roadwheel data detected during driving may be observed by or communicated to the controller 808 and utilized by the methods described herein. Additionally, in the illustrative variation shown, brakes 812 are located near roadwheels 802. Controller 808 and any other controller, for example controller 818, may be provided to carry out one or more functions described herein and may include a processor 820, memory 822, wherein the instructions 824 stored in the memory 822 are executable by the processor 820 to determine if the hand wheel angle sensor 807 or if the pinion 804, rack 805, pinion sensor 809, or rack sensor 810 have failed. Furthermore, wherein the instructions 824 stored in memory 822 are executable by the processor 820 to carry out any of the methods or achieve any functionality described herein.

Modules and controllers described herein may include software, hardware, or a computing device including non-transitory computer readable medium, such as but not limited to memory, having instructions stored there on, and a processor for executing the instructions to perform the acts, steps, methods and functionality described herein. Multiple modules and controllers and their associated acts, steps, methods and functionality may be contained in or achieved by one or more computing devices.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Variation 1 may include a product comprising a non-transitory computer readable medium having instructions thereon executable by an electronic processor to implement functionality comprising: receiving vehicle dynamics data input; receiving or calculating one or more stability indicators and thresholds; using stability indicator duration and magnitude to determine if an instability event is occurring; if an instability event is occurring, using at least one of current vehicle dynamics data input, current Mu estimate, current learned brake-to-steer modifications, or previously stored stability memory data to calculate a first brake-to-steer modification.

Variation 2 may include the product as set forth in Variation 1 further comprising, if an instability event is occurring, estimating a new maximum achievable vehicle acceleration in terms of received vehicle dynamics data input, from the stored stability memory data.

Variation 3 may include the product as set forth in Variation 2 further comprising using the first estimated maximum achievable vehicle acceleration, previous estimated maximum achievable vehicle acceleration, current estimated Mu values, and previous estimated Mu values to calculate a first, learned Mu estimate.

Variation 4 may include the product as set forth in any of Variations 1-3 further comprising, if an instability event is not occurring, monitoring the received vehicle dynamics data input to determine if the vehicle maneuver exceeds the current estimated maximum achievable vehicle acceleration.

Variation 5 may include the product as set forth in Variation 4 further comprising, if the vehicle acceleration exceeds the current estimated maximum achievable vehicle acceleration while an unstable event is not occurring, using at least one of current vehicle dynamics data input, current Mu estimate, current learned brake-to-steer modifications, or previously stored stability memory data to calculate a second brake-to-steer modification.

Variation 6 may include the product as set forth in Variation 5 further comprising estimating a second maximum achievable vehicle acceleration in terms of received vehicle dynamics data input, from the stored stability memory data.

Variation 7 may include the product as set forth in Variation 6 further comprising using the second estimated maximum achievable vehicle acceleration, previous estimated maximum achievable vehicle acceleration, current estimated Mu values, and previous estimated Mu values to calculate a second, learned Mu estimate.

Variation 8 may include the product as set forth in any of Variations 1-8 further comprising using the first brake-to-steer modification to alter at least one of brake-to-steer brake or powertrain commands in a proactive, reactive, and non-transitory manner.

Variation 9 may include the product as set forth in Variation 8 wherein the using the first brake-to-steer modification to alter at least one of brake-to-steer brake or powertrain commands occurs before brake-to-steer function activation.

Variation 10 may include the product as set form in any of Variation 1-9 further comprising using the first, learned Mu estimate to enhance brake-to-steer functionality.

Variation 11 may include the product as set forth in any of Variations 1-10 further comprising transmitting the first, learned Mu estimate to other vehicle functions.

Variation 12 may include a method of preforming act using an electronic controller comprising: receiving vehicle dynamics data input; receiving or calculating one or more stability indicators and thresholds; using stability indicator duration and magnitude to determine if an instability event is occurring; if an instability event is occurring, using at least one of current vehicle dynamics data input, current Mu estimate, current learned brake-to-steer modifications, or previously stored stability memory data to calculate a first brake-to-steer modification.

Variation 13 may include the method as set forth in Variation 12 further comprising, if an instability event is occurring, estimating a new maximum achievable vehicle acceleration in terms of received vehicle dynamics data input, from the stored stability memory data.

Variation 14 may include the method as set forth in Variation 13 further comprising using the first estimated maximum achievable vehicle acceleration, previous estimated maximum achievable vehicle acceleration, current estimated Mu values, and previous estimated Mu values to calculate a first, learned Mu estimate.

Variation 15 may include the method as set forth in any of Variation 12-14 further comprising, if an instability event is not occurring, monitoring the received vehicle dynamics data input to determine if the vehicle maneuver exceeds the current estimated maximum achievable vehicle acceleration.

Variation 16 may include the method as set forth in Variation 15 further comprising, if the vehicle acceleration exceeds the current estimated maximum achievable vehicle acceleration while an unstable event is not occurring, using at least one of current vehicle dynamics data input, current Mu estimate, current learned brake-to-steer modifications, or previously stored stability memory data to calculate a second brake-to-steer modification.

Variation 17 may include the method as set forth in Variation 16 further comprising estimating a second maximum achievable vehicle acceleration in terms of received vehicle dynamics data input, from the stored stability memory data.

Variation 18 may include the method as set forth in Variation 17 further comprising using the second estimated maximum achievable vehicle acceleration, previous estimated maximum achievable vehicle acceleration, current estimated Mu values, and previous estimated Mu values to calculate a second, learned Mu estimate.

Variation 19 may include the method as set forth in any of Variations 12-18 further comprising using the first brake-to-steer modification to alter at least one of brake-to-steer brake or powertrain commands in a proactive, reactive, and non-transitory manner.

Variation 20 may include the method as set forth in any of Variation 19 wherein the using the first brake-to-steer modification to alter at least one of brake-to-steer brake or powertrain commands occurs before brake-to-steer function activation.

Variation 21 may include the method as set forth in any of Variations 12-20 further comprising using the first, learned Mu estimate to enhance brake-to-steer functionality.

Variation 22 may include the method as set forth in any of Variation 12-21 further comprising transmitting the first, learned Mu estimate to other vehicle functions.

The above description of select variations within the scope of the invention is merely illustrative in nature and, thus, variations or variants thereof are not to be regarded as a departure from the spirit and scope of the invention.

What is claimed is:

1. A product comprising a non-transitory computer readable medium having instructions thereon executable by an electronic processor to implement functionality comprising:
   receiving vehicle dynamics data input;
   receiving or calculating one or more stability indicators and thresholds;
   using stability indicator duration and magnitude to determine when an instability event is occurring;
   when an instability event is occurring, using at least one of a first learned Mu estimate, current learned brake-to-steer modifications, or previously stored stability memory data to calculate a first brake-to-steer modification.

2. The product as set forth in claim 1 further comprising, when an instability event is occurring, estimating a new maximum achievable vehicle acceleration in terms of received vehicle dynamics data input, from the stored stability memory data.

3. The product as set forth in claim 2 further comprising using the first estimated maximum achievable vehicle acceleration, previous estimated maximum achievable vehicle acceleration, current estimated Mu values, and previous estimated Mu values to calculate the first learned Mu estimate.

4. The product as set forth in claim 1 further comprising, when an instability event is not occurring, monitoring the received vehicle dynamics data input to determine when the vehicle maneuver exceeds the current estimated maximum achievable vehicle acceleration.

5. The product as set forth in claim 4 further comprising, when the vehicle acceleration exceeds the current estimated maximum achievable vehicle acceleration while an unstable event is not occurring, using at least one of current vehicle dynamics data input, current Mu estimate, current learned brake-to-steer modifications, or previously stored stability memory data to calculate a second brake-to-steer modification.

6. The product as set forth in claim 5 further comprising estimating a second maximum achievable vehicle acceleration in terms of received vehicle dynamics data input, from the stored stability memory data.

7. The product as set forth in claim 6 further comprising using the second estimated maximum achievable vehicle acceleration, previous estimated maximum achievable vehicle acceleration, current estimated Mu values, and previous estimated Mu values to calculate a second learned Mu estimate.

8. The product as set forth in claim 1 further comprising using the first brake-to-steer modification to alter at least one of brake-to-steer brake or powertrain commands in a proactive, reactive, and non-transitory manner.

9. The product as set forth in claim 8 wherein the using the first brake-to-steer modification to alter at least one of brake-to-steer brake or powertrain commands occurs before brake-to-steer function activation.

10. The product as set forth in claim 1 further comprising using the first, first learned Mu estimate to enhance brake-to-steer functionality.

11. The product as set forth in claim 1 further comprising transmitting the first learned Mu estimate to other vehicle functions.

12. The product as set forth in claim 1 wherein the first brake-to-steer modification is calculated using the first learned Mu estimate.

13. The product as set forth in claim 1 wherein the first brake-to-steer modification is calculated using the current learned brake-to-steer modifications.

14. The product as set forth in claim 1 wherein the first brake-to-steer modification is calculated using the previously stored stability memory data.

15. A method of preforming act using an electronic controller comprising:
   receiving vehicle dynamics data input;
   receiving or calculating one or more stability indicators and thresholds;
   using stability indicator duration and magnitude to determine when an instability event is occurring;
   when an instability event is occurring, using at least one of a first learned Mu estimate, current learned braketo-steer modifications, or previously stored stability memory data to calculate a first brake-to-steer modification.

16. The method as set forth in claim 15 further comprising, when an instability event is occurring, estimating a new maximum achievable vehicle acceleration in terms of received vehicle dynamics data input, from the stored stability memory data.

17. The method as set forth in claim 16 further comprising using the first estimated maximum achievable vehicle acceleration, previous estimated maximum achievable vehicle acceleration, current estimated Mu values, and previous estimated Mu values to calculate the first learned Mu estimate.

18. The method as set forth in claim 15 further comprising, when an instability event is not occurring, monitoring the received vehicle dynamics data input to determine when the vehicle maneuver exceeds the current estimated maximum achievable vehicle acceleration.

19. The method as set forth in claim 18 further comprising, when the vehicle acceleration exceeds the current estimated maximum achievable vehicle acceleration while an unstable event is not occurring, using at least one of current vehicle dynamics data input, current Mu estimate, current learned brake-to-steer modifications, or previously stored stability memory data to calculate a second brake-to-steer modification.

20. The method as set forth in claim 19 further comprising estimating a second maximum achievable vehicle acceleration in terms of received vehicle dynamics data input, from the stored stability memory data.

21. The method as set forth in claim 20 further comprising using the second estimated maximum achievable vehicle acceleration, previous estimated maximum achievable vehicle acceleration, current estimated Mu values, and previous estimated Mu values to calculate a second learned Mu estimate.

22. The method as set forth in claim 15 further comprising using the first brake-to-steer modification to alter at least one of brake-to-steer brake or powertrain commands in a proactive, reactive, and non-transitory manner.

23. The method as set forth in claim 22 wherein the using the first brake-to-steer modification to alter at least one of brake-to-steer brake or powertrain commands occurs before brake-to-steer function activation.

24. The method as set forth in claim 15 further comprising using the first, first learned Mu estimate to enhance brake-to-steer functionality.

25. The method as set forth in claim 15 further comprising transmitting the first learned Mu estimate to other vehicle functions.

26. The method as set forth in claim 15 wherein the first brake-to-steer modification is calculated using the first learned Mu estimate.

27. The method as set forth in claim 15 wherein the first brake-to-steer modification is calculated using the current learned brake-to-steer modifications.

28. The method as set forth in claim 15 wherein the first brake-to-steer modification is calculated using the previously stored stability memory data.

* * * * *